(12) United States Patent
Danninger et al.

(10) Patent No.: US 8,117,553 B2
(45) Date of Patent: Feb. 14, 2012

(54) METHOD AND SYSTEM TO MAINTAIN A USER INTERFACE CONTEXT

(75) Inventors: Michael Danninger, Landau (DE); Matthias Harbusch, Bad Schonborn (DE); Marie-Simone Proksch, Pforzheim (DE); Dagmar Repschlager, Wiesloch (DE)

(73) Assignee: SAP Aktiengesellschaft, Walldorf (DE)

( * ) Notice: Subject to any disclaimer, the term of this patent is extended or adjusted under 35 U.S.C. 154(b) by 1264 days.

(21) Appl. No.: 10/848,027

(22) Filed: May 17, 2004

(65) Prior Publication Data

US 2005/0257162 A1    Nov. 17, 2005

(51) Int. Cl.
  *G06F 3/048* (2006.01)
(52) U.S. Cl. ........ 715/764; 715/766; 715/767; 715/768; 715/797; 715/806; 715/828; 715/853
(58) Field of Classification Search .................. 715/764, 715/766, 767, 768, 797, 806, 828, 853
See application file for complete search history.

(56) References Cited

U.S. PATENT DOCUMENTS

| | | | |
|---|---|---|---|
| 6,011,550 A | 1/2000 | Capps et al. | |
| 6,380,957 B1* | 4/2002 | Banning | 715/828 |
| 6,448,986 B1* | 9/2002 | Smith | 715/801 |
| 6,601,057 B1* | 7/2003 | Underwood et al. | 715/207 |
| 6,734,882 B1* | 5/2004 | Becker | 715/815 |
| 6,950,993 B2* | 9/2005 | Breinberg | 715/801 |
| 6,957,384 B2* | 10/2005 | Jeffery et al. | 715/202 |
| 7,818,682 B2* | 10/2010 | Brand et al. | 715/763 |
| 2002/0083090 A1* | 6/2002 | Jeffrey et al. | 707/501.1 |
| 2003/0164859 A1* | 9/2003 | Evans | 345/792 |
| 2004/0255308 A1* | 12/2004 | Leban et al. | 719/328 |
| 2005/0177801 A1 | 8/2005 | Vronay et al. | |

* cited by examiner

*Primary Examiner* — Weilun Lo
*Assistant Examiner* — Shashi Becker
(74) *Attorney, Agent, or Firm* — Blakely, Sokoloff, Taylor & Zafman LLP (57) ABSTRACT

A system, to maintain a user interface context receives a request for a first user interface element that is hidden from view on a user interface. The request causes the system to integrate the first user interface element into the user interface by regenerating the user interface to accommodate the first user interface element while maintaining the user interface context.

24 Claims, 10 Drawing Sheets

METHOD AND SYSTEM TO MAINTAIN A USER INTERFACE CONTEXT

FIELD OF THE INVENTION

An embodiment relates generally to the technical field of communicating information via a network, in one exemplary embodiment, to maintain a user interface context.

BACKGROUND OF THE INVENTION

Performing a task on a computer may sometimes be tedious and tiresome. For example, a user may perform a task that requires information that is not available on a user interface that is presently viewed by the user. Some systems attempt to solve this problem by providing a user interface control that, upon selection, may trigger the retrieval of the desired information in a pop-up window or link to another web page. In both instances, the concentration of the user is interrupted. In addition, the user must visually reorient by returning to the original web page, or by closing the pop-up window.

SUMMARY OF THE INVENTION

A method to maintain a user interface context. The method includes receiving a request for a first user interface element that is hidden from view on a user interface, the request to trigger an integration of the first user interface element into the user interface; and regenerating the user interface to accommodate the first user interface element as integrated into the user interface.

BRIEF DESCRIPTION OF THE DRAWINGS

The present invention is illustrated by way of example and not limitation in the figures of the accompanying drawings, in which like references indicate similar elements and in which.

DETAILED DESCRIPTION

A method and system to maintain a user interface context are described. In the following description, for purposes of explanation, numerous specific details are set forth in order to provide a thorough understanding of the present invention. It will be evident, however, to one skilled in the art that the present invention may be practiced without these specific details.

In general, embodiments described below feature a system to maintain a context. A user that is viewing a user interface is performing a task that may require information that is not readily available. The user selects a user interface element on the user interface to request the information. In response, the system regenerates the user interface to accommodate an integration of the requested information by displaying a hidden user interface element and rearranging existing user interface elements on the user interface. For example, one content area of the user interface may be expanded to include the requested information and another content area of the user interface may be contracted (or collapsed). The context of the user interface is maintained by not opening a pop-up window, not linking to another user interface and by rearranging the existing user interface elements on the user interface in a manner that maintains the visual context for the user.

Figure 1:
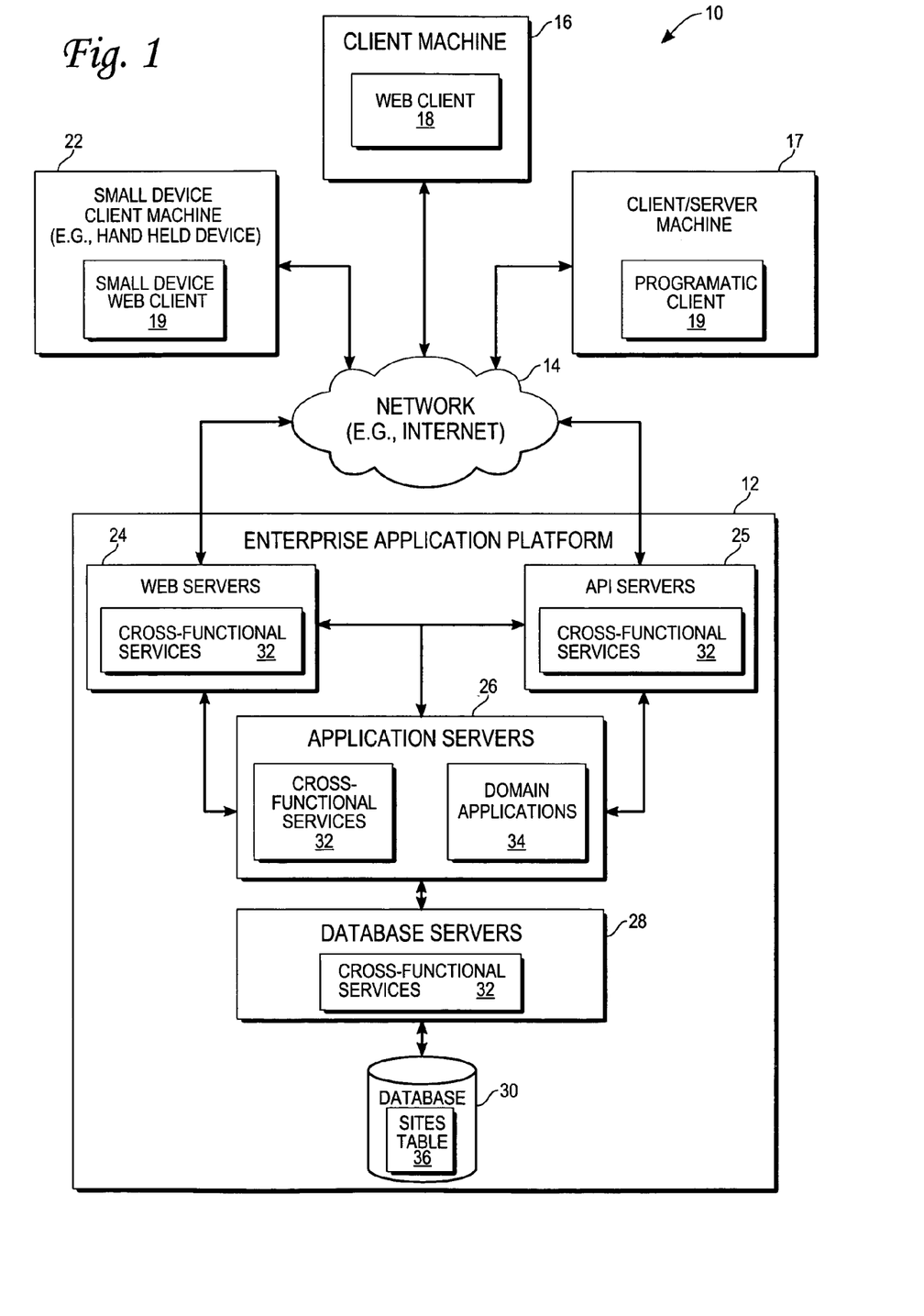
FIG. 1 is a network diagram depicting a system, according to one exemplary embodiment of the present invention.

FIG. 1 is a network diagram depicting a system 10, according to one exemplary embodiment, having a client-server architecture. A platform, in the exemplary form of an enterprise application platform 12, provides server-side functionality, via a network 14 (e.g., the Internet) to one or more clients. FIG. 1 illustrates, for example, a client machine 16 with web client 18 (e.g., a browser, such as the INTERNET EXPLORER browser developed by Microsoft Corporation of Redmond, Wash. State), a small device client machine 22 with a small device web client 19 (e.g., a browser without a script engine) and a client/server machine 17 with a programmatic client 19.

Turning specifically to the enterprise application platform 12, web servers 24, and Application Program Interface (API) servers 25 are coupled to, and provide web and programmatic interfaces to, application servers 26. The application servers 26 are, in turn, shown to be coupled to one or more databases servers 28 that facilitate access to one or more databases 30. The web servers 24, Application Program Interface (API) servers 25, and database servers 28 host cross-functional services 32. The application servers 26 host domain applications 34 and cross-functional services 32.

The cross-functional services 32 provide services to users and processes that utilize the information enterprise application platform 12. For instance the cross-functional services 32 provide portal services (e.g., web services), database services and connectivity to the domain applications 34 for users that operate the client machine 16, the client/server machine 17 and the small device client machine 22. In addition, the cross-functional services 32 provide an environment for delivering enhancements to existing applications and for integrating third party and legacy applications with existing cross-functional services 32 and domain applications 34. Further, while the system 10 shown in FIG. 1 employs a client-server architecture, the present invention is of course not limited to such an architecture, and could equally well find application in a distributed, or peer-to-peer, architecture system.

Figure 2:
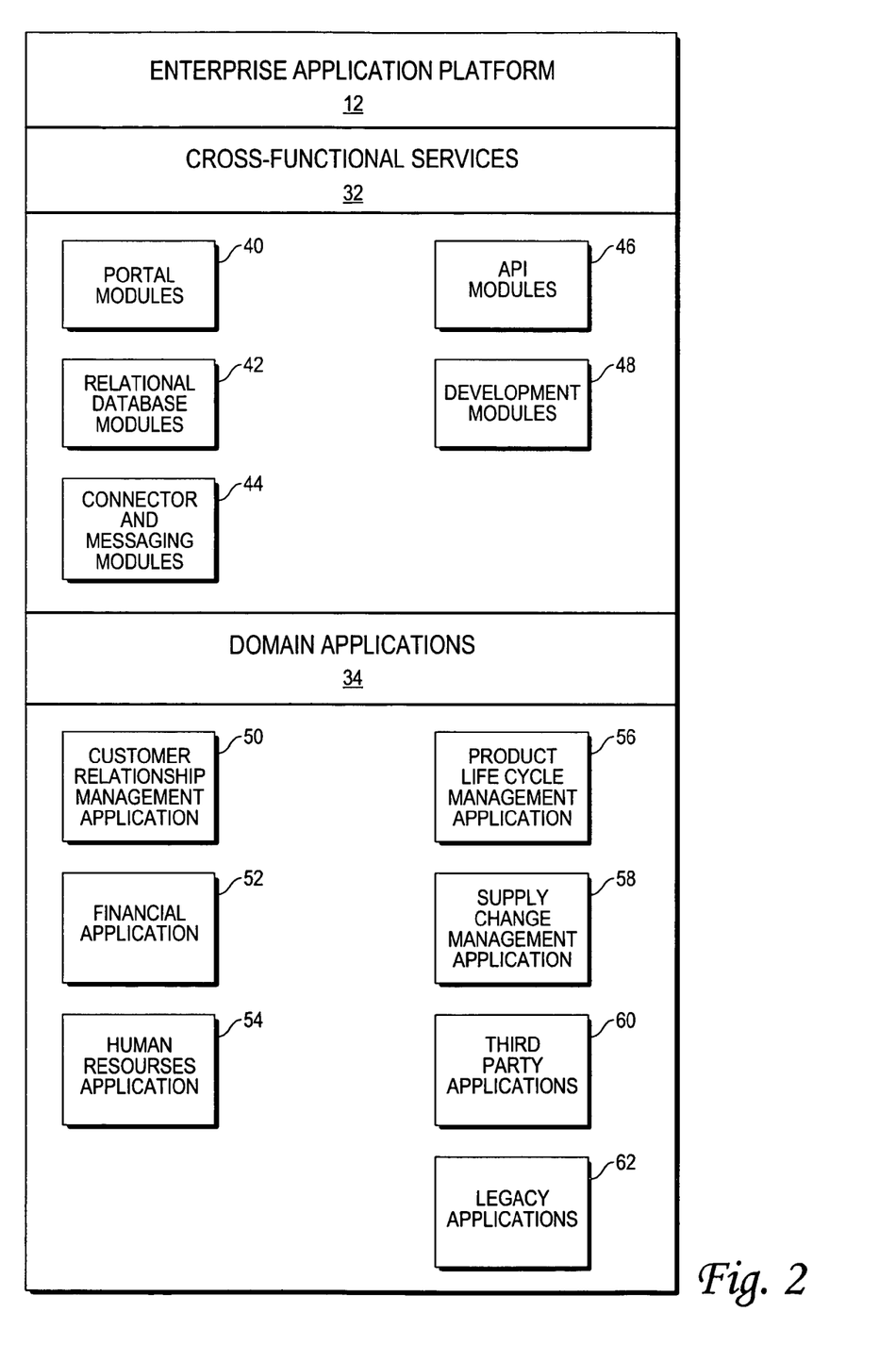
FIG. 2 is a block diagram illustrating enterprise applications and services, in one exemplary embodiment of the present invention.

FIG. 2 is a block diagram illustrating enterprise applications and services as embodied in the enterprise application platform 12, according to an exemplary embodiment. The enterprise application platform 12 includes cross-functional services 32 and domain applications 34. The cross-functional services 32 include portal modules 40, relational database modules 42, connector and messaging modules 44, application processing interface (API) modules 46, and development modules 48.

The portal modules 40 enable a single point of access to other cross-functional services 32 and domain applications 34 for the client machine 16, the small device client machine 22 and the client/server machine 17. The portal modules 40 are utilized to author and maintain web pages that present content (e.g., user interface elements and navigational controls) to the user. In addition, the portal modules 40 enable user roles, a construct that associates a role with a specialized environment that is utilized by a user to execute tasks, utilize services and exchange information with other users and within a defined scope. For example, the role determines the content that is available to the user and the activities that the user may perform. The portal modules 40 comply with a variety of Internet and web services standards, including Java, J2EE, XML, JCA, JAAS, X.509, LDAP, WSDL, WSRR, SOAP, and UDDI as well as support from Microsoft.NET.

The relational database modules 42 provide support services for access to the database 30. The relational database modules 42 provide support for object relational mapping, database independence and distributed computing. The relational database modules 42 are utilized to add, delete, update and manage database elements.

The connector and messaging modules 44 enable communication across different types of messaging systems that are utilized by the cross-functional services 32 and the domain applications 34 by providing a common messaging application processing interface. The connector and messaging modules 44 enable asynchronous communication on the enterprise application platform 12.

The application processing interface (API) modules 46 enable the development of service-based applications by exposing an interface to existing and new applications as services. Repositories are included in the platform as a central place to find available services when building applications.

The development modules 48 provide a development environment for the addition, integration, updating and extension of software components on the enterprise application platform 12 without impacting existing cross-functional services 32 and domain applications 34.

Turning to the domain applications 34, the customer relationship management applications 50 enable access to and facilitate collecting and storing of relevant personalized information from multiple data sources and business processes. Enterprise personnel that are tasked with developing a buyer into a long-term customer may utilize the customer relationship management applications 50 to provide assistance to the buyer throughout a customer engagement cycle.

The financial applications 52 may be utilized by enterprise personnel and business processes to track and control financial transactions within the enterprise application platform 12. The financial applications 52 facilitate the execution of operational, analytical and collaborative tasks that are associated with financial management. Specifically, the financial applications 52 enable the performance of tasks related to financial accountability, planning, forecasting, and managing the cost of finance.

The human resource applications 54 may be utilized by enterprise personnel and business processes to manage, deploy, and track enterprise personnel. Specifically, the human resource applications 54 enable the analysis of human resource issues and facilitate human resource decisions based on real time information.

The product life cycle management applications 56 enable the management of a product throughout the life cycle of the product. For example, the product life cycle management applications 56 enable collaborative engineering, custom product development, project management, asset management and quality management among business partners.

The supply chain management applications 58 enable monitoring of performances that may be observed in supply chains. The supply chain management applications 58 facilitate adherence to production plans and on-time delivery of products and services.

The third party applications 60 as well as legacy applications 62 of the may be integrated with domain applications 34 and utilize cross-functional services on the enterprise application platform 12.

Figure 3:
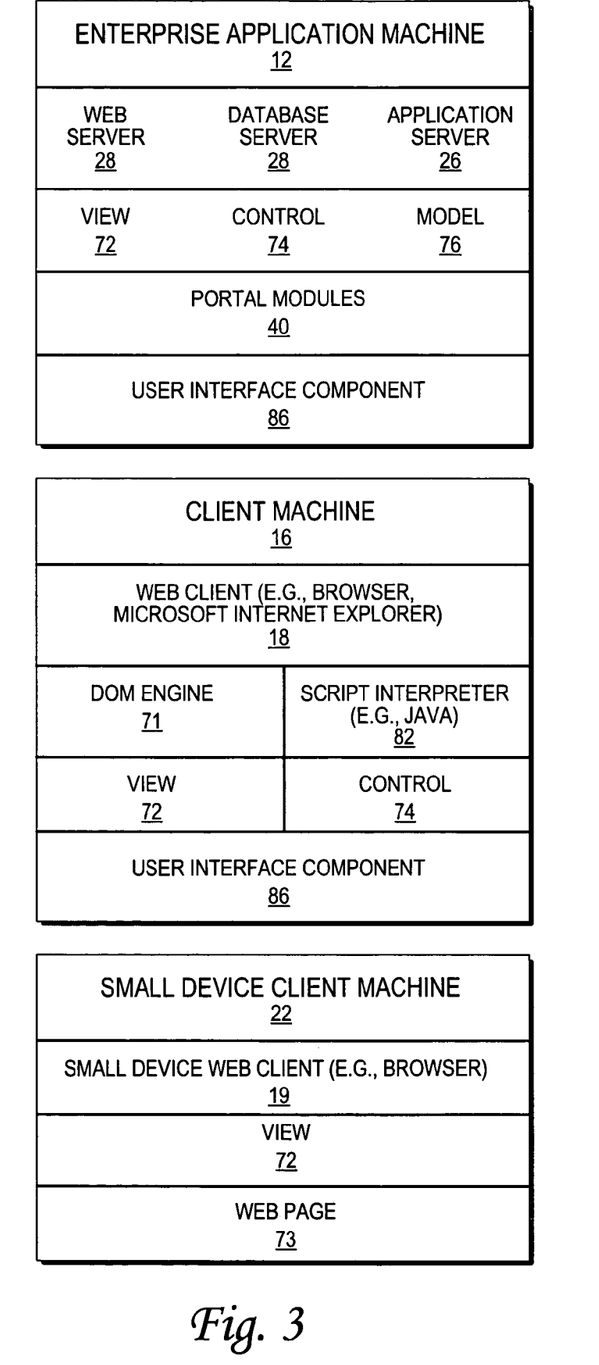
FIG. 3 is a block diagram illustrating hardware and software components, according to an exemplary embodiment of the present invention.

FIG. 3 illustrates hardware and software components utilized by an enterprise application platform 12, according to an embodiment. The hardware components include the enterprise application machine 12, including the servers previously described, the client machine 16 and the small device client machine 22. The enterprise application machine 12 includes a view, control, model construct, and a user interface component 86. The view construct 72, controller construct 74, and model construct 76 illustrate a development pattern that is utilized to decouple user interface interaction into three distinct roles. The portal modules 40 include one or more user interface components 86 that are utilized to process user interface requests, generate user interfaces and regenerate user interfaces.

The client machine 16 includes a web client 18 that provides a platform for a DOM engine 71, a script interpreter 82, and one or more user interface components 86. The web client 18 enables a user to generate user interfaces, regenerate user interfaces and display user interfaces (e.g., web pages) that are downloaded from the web server 24 in the form of one or more user interface components 86. The display object model (DOM) engine 71 includes an Application Program Interface (API) to manipulate HTML screen objects which are examples of user interface elements that are included as metadata in a user interface component 86. For example, a user interface element may be a graphical image of a table, a list of items, text, numeric data, a menu of selectable links, a calendar with selectable date entries, etc. The DOM API provides access for manipulation of the user interface elements by software components in the user interface component 86 the web client 18. The user interface component(s) 86 include script that may be interpreted by the script interpreter 82. The user interface components 86 may be communicated to the web client 18 by the enterprise application platform 12.

The small device client machine 22 utilizes a small device web client 19 to display a web page 73 that is communicated to the small device client machine 22 from the enterprise application platform 12. Note that the small device web client 19 does not include a script interpreter 82.

Figure 4:
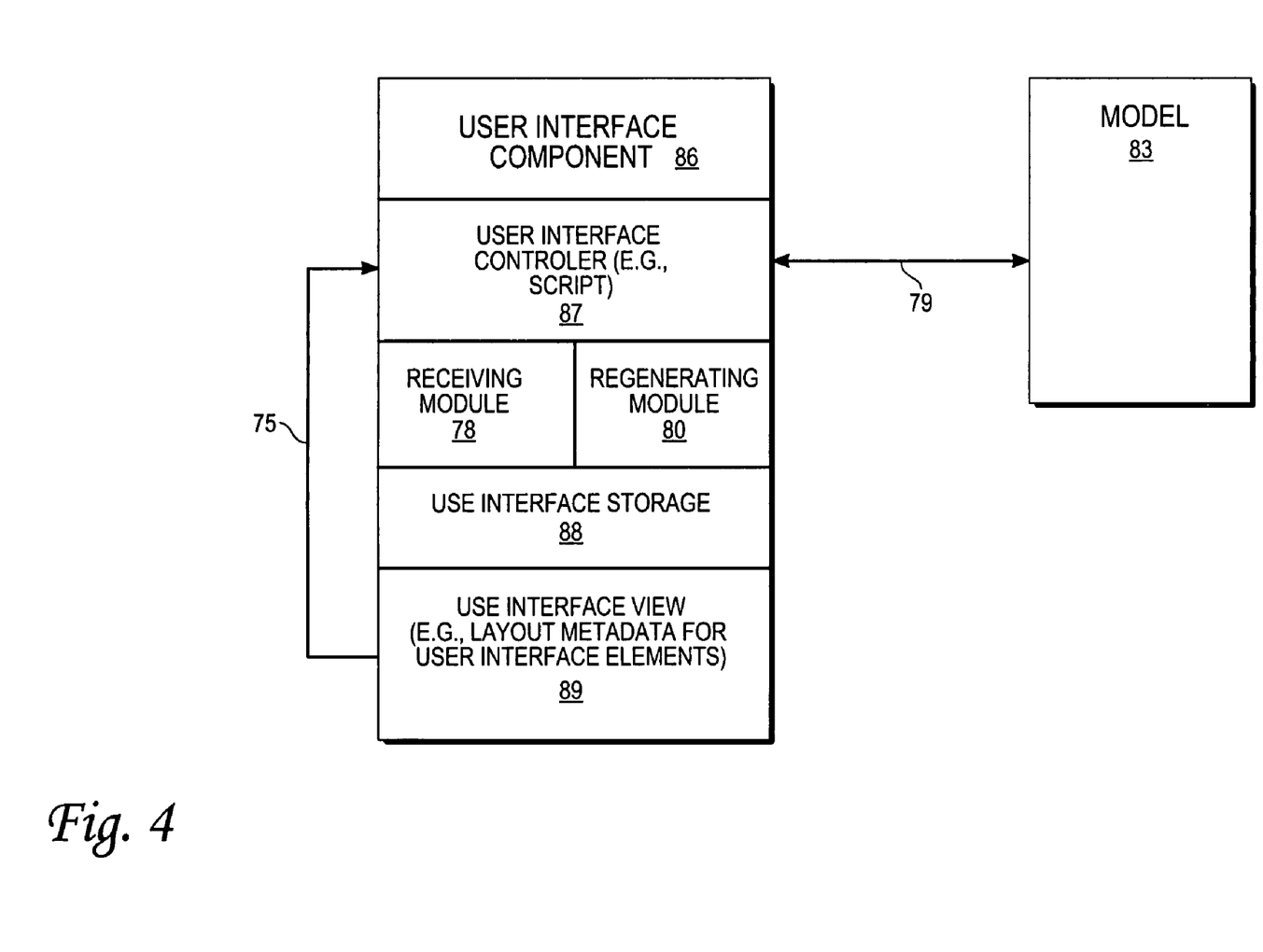
FIG. 4 is a block diagram illustrating a user interface component and a model, according to an exemplary embodiment of the present invention.

FIG. 4 is a block diagram illustrating a user interface component 86 and a model 83, according to an embodiment. The user interface component 86 includes a user interface controller 87, user interface storage 88, and a user interface view 89. The user interface view 89 includes layout metadata that is utilized to generate HTML for user interface elements. The layout metadata defines the layout of user interface elements on the screen of a client device (e.g., the client machine 16, the small device client machine 22 or the client/server machine 17). The user interface elements may include navigational controls (e.g., Button, checkbox, radio button group, links, etc.) that if selected by a user may result in communicating an event to the user interface controller 87, as illustrated with an arrow 75.

The user interface controller 87 includes user interface logic in the form of script including a receiving module 78, and a regenerating module 80. The receiving module 78 is utilized to receive a request for a user interface element that is hidden from view on a user interface. The regenerating module 80 is utilized to regenerate a user interface to accommodate the requested hidden user interface element and, in some embodiments, to communicate a rendered web page 73. The user interface controller 74 may read and change the model 83 (e.g., an object or application including business logic), as illustrated with an arrow 79, and may determine the next user interface view(s) 89 to be displayed. The model 83 includes business logic, memory for storage, and persistent layers that are hidden from the user interface part of the pattern (e.g., view and control).

The user interface storage 88 is utilized as private memory by the user interface controller 87. The user interface storage 88 is organized as a hierarchical structures of objects (e.g., that may reference sub-objects) that include data elements that may be bound to user interface elements and/or attributes in the model (e.g., the abstract definition of the layer that encapsulates the business logic). In addition, the data elements in the user interface storage 88 of one user interface component 86 may be bound to a data element in another user interface component 86. The notion of binding implies an automatic flow of data between corresponding data elements, model attributes and user interface elements. Thus, data may travel automatically from a user interface element to a user interface controller 87, to other another user interface controller 87 or to the model 83 and vice versa.

Figure 5:
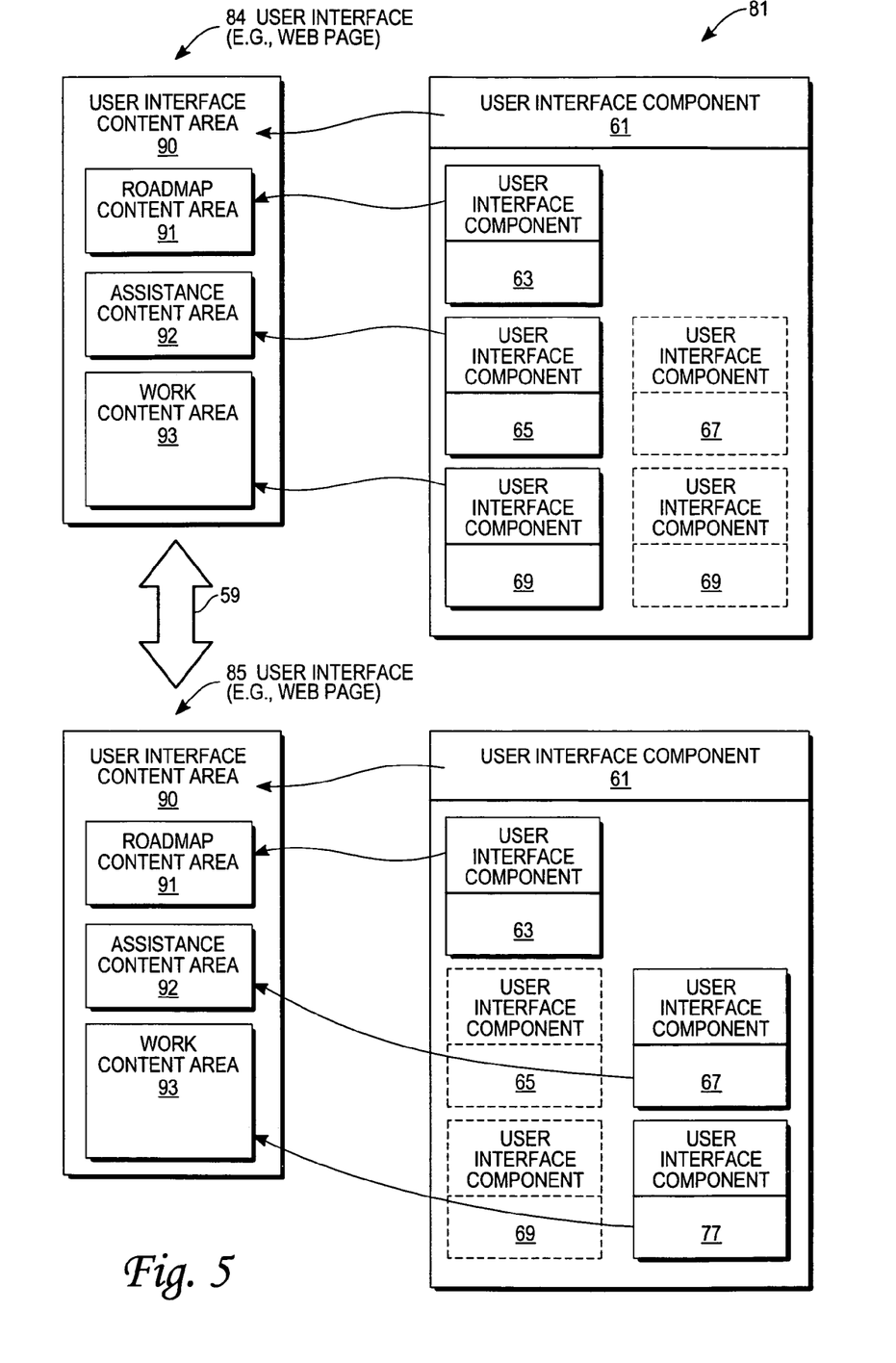
FIG. 5 is a block diagram illustrating user interface content areas and user interface components, according to an exemplary embodiment of the present invention.

FIG. 5 illustrates a block diagram illustrating user interfaces 81 that maintain a context for a user, according to an embodiment. The user interfaces 81 (e.g., web pages) include a user interface 84 with an assistance content area 92 that is collapsed and a user interface 85 that includes an assistance content area 92 that is expanded. An arrow 59 illustrates that a user may toggle between the user interface 84 and the user interface 85 by selecting a user interface element on the respective user interfaces 84 and 85.

Both user interfaces 84 and 85 include a user interface content area 90, a roadmap content area 91, an assistance content area 92 and work content area 93. Organizing user interface elements according to the respective content areas enables a consistent presentation of corresponding content to the user. Each of the content areas is associated with one or more user interface components 61, 63, 65, 67, 69, and 77 that include a user interface controller 87, a user interface storage 88 and a user interface view for managing the content area and for defining the location and size of the respective content area and the user interface elements that will be displayed inside respective content areas. Note that one user interface component 86 may be nested inside of another user interface component 86 (e.g., the user interface components 63, 65, 69 and 77 are nested inside of user interface component 61) Also, note that the assistance content area 92 and the work content area 93 are both associated with two user interface components 86. The user interface component 65 defines a collapsed area for the assistance content area 92 and the user interface component 69 defines an expanded area for the work content area 93. In addition, the user interface component 67 defines an expanded area for the assistance content area 92 and the user interface component 77 defines a collapsed area for the work content area 93.

Figure 6:
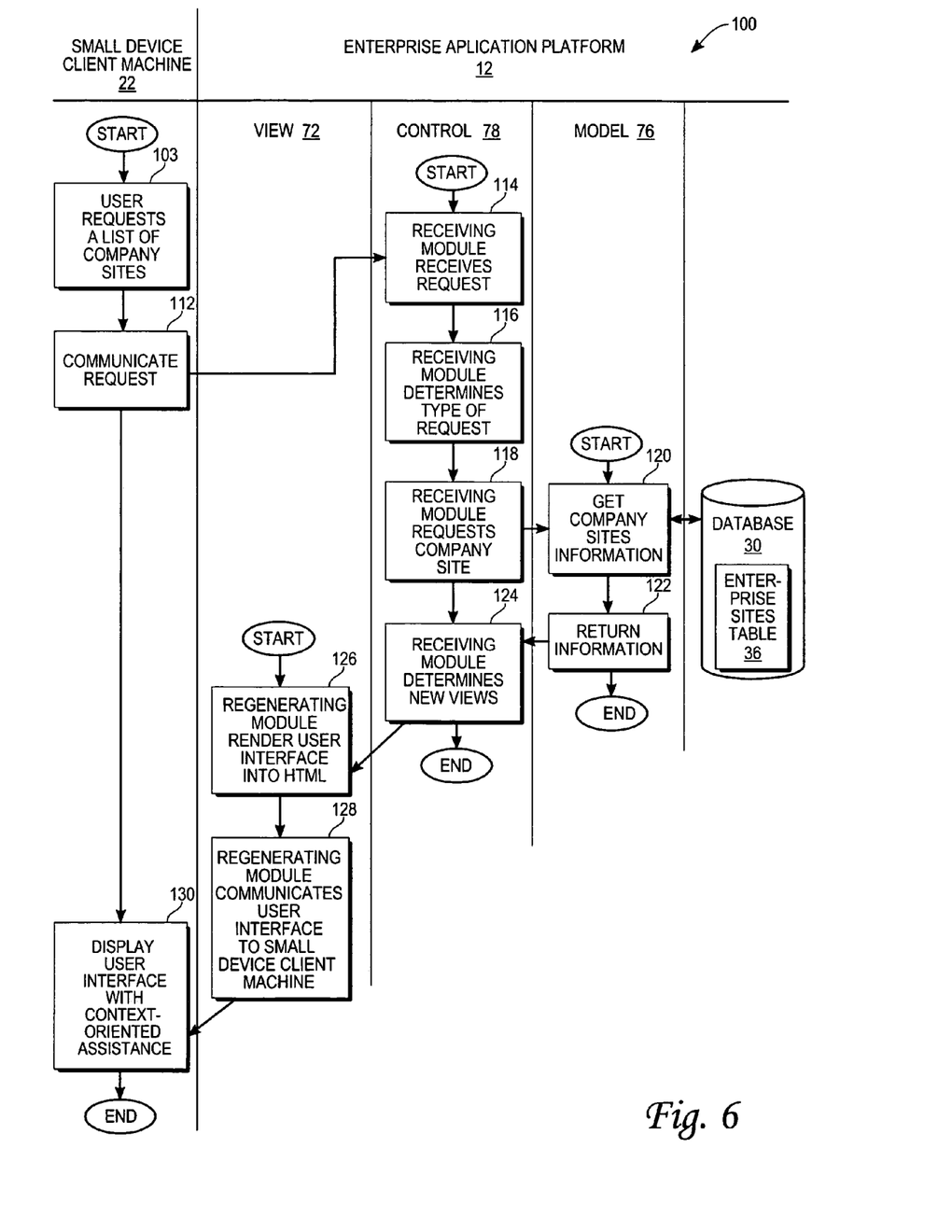
FIG. 6 is a flow chart illustrating a method, according to an exemplary embodiment of the present invention, to maintain a user interface context.

FIG. 6 illustrates a method 100, according to an embodiment, to maintain a user interface context. The small device client machine 22 is illustrated on the left and the enterprise application platform 12 is illustrated on the right.

At box 102, a user at a small device client machine 22 is performing a task that requires entering information regarding a business trip, including the names and addresses of locations visited. The user may be utilizing a hand-held device (e.g., a personal digital assistant) to display and enter the information.

Figure 7:
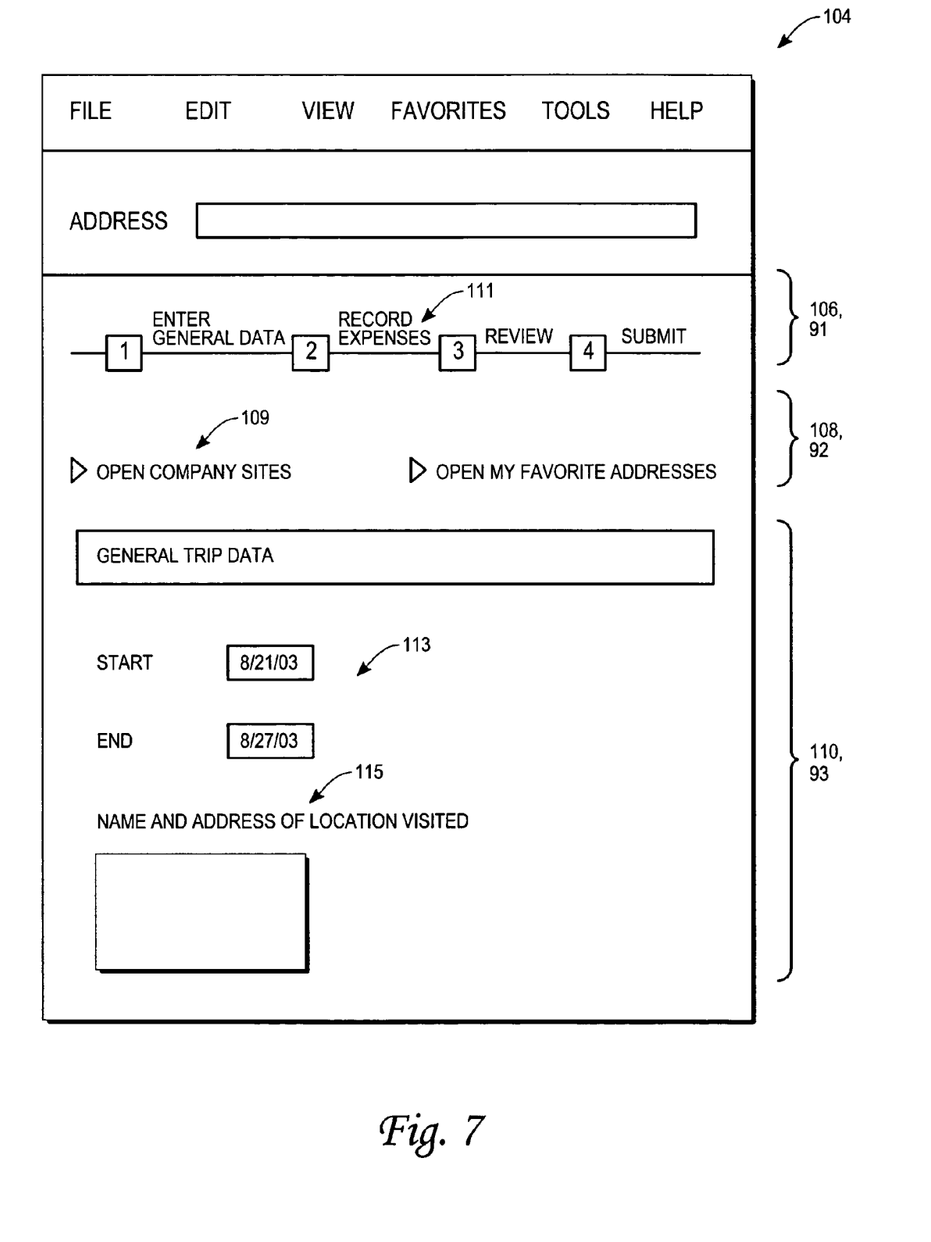
FIGS. 7-9 illustrate user interface screens, according to an exemplary embodiment of the present invention.

FIG. 7 illustrates a user interface 104, according to an embodiment, to enter the names and address of locations visited. The user interface 104 includes roadmap user interface elements 106 that are displayed in a roadmap content area 91, assistance user interface elements 108 that are displayed in an assistance content area 92, and work area user interface elements 110 that are displayed in a work content area 93. The roadmap user interface elements 106 include a highlighted user interface element 111 indicating the user is presently recording expenses. The assistance user interface elements 108 include an assistance string 109, ">Open Company Sites" (e.g., note arrow pointing to the right). The work area user interface elements 110 includes an input box 113 that may be utilized to enter the start and end date of a trip and an input box 115 that may be utilized to enter name and the address of locations of visited.

Returning to FIG. 6 at box 103, the user utilizes a mouse or keyboard stroke(s) to select the assistance string 109.

At box 112, small device client machine 22 communicates an event to the receiving module 78 in the corresponding user interface controller 87 on the web server 24 at the enterprise application platform 12 responsive to the user selecting the assistance string 109.

At box 114, the receiving module 78 associated with the assistance content area 92 receives the request and invokes the receiving module 78 in the user interface controller 87 associated with the user interface content area 90.

At box 116, the receiving module 78 examines the request and determines that the user has requested expansion of the assistance content area 92 to display a list of company sites 134, a user interface element presently hidden from view on the user interface 104.

At box 118, the receiving module 78 requests the sites table 36 from the database 30 based on the user request.

At box 120, the model 83 receives the request, generates a database query to read the sites table 36 from the database 30, receives the list of company sites 134, and loads the list of company sites 134 in attributes of the model.

At box 122, the model 83 and propagates the list of company sites 134 to the receiving module 78 that stores the list of company sites 134 in the user interface storage 88 of the user interface components 61.

At box 124, the receiving module 78 utilizes the request from the user to determine that the new views that are required to expand the assistance content area 92 and contract the work content area 93 to provide screen space for the expanded assistance content area 92. To this end, the user interface elements in the assistance content area 92 may be regenerated with the list of company sites 134 and the user interface elements in the work content area 93 may be regenerated without the input box 115 but with the input box 113. The user interface context is maintained by integrating the list of company sites 134 on the user interface 104 and by minimizing changes to the other user interface elements on the user interface (e.g., the roadmap user interface elements 106 are not changed; the input box 113 in the work content area 93 is pushed lower but nevertheless remains on the user interface; and the input box 115 is removed from the user interface but may be immediately restored by collapsing the assistance content area 92). The visual effect to the user is that the list of company sites 134 may be revealed and hidden on the user interface without changing the user interface (e.g., linking to another web page, opening a pop-up window, etc.).

Accordingly, the receiving module 78 identifies the user interface components 86 that are necessary to perform the requested regeneration and passes control to the regenerating module 80.

At box 126, the regenerating module 80 utilizes the layout meta-data from the appropriate user interface views 89 (e.g., the views corresponding to the user interface components 67 and 77), and the list of company sites 134 to calculate the necessary HTML to render a user interface with an expanded assistance content area 92.

At box 128, the regenerating module 80 communicates the requested user interface to the small device client machine 22.

Figure 8:
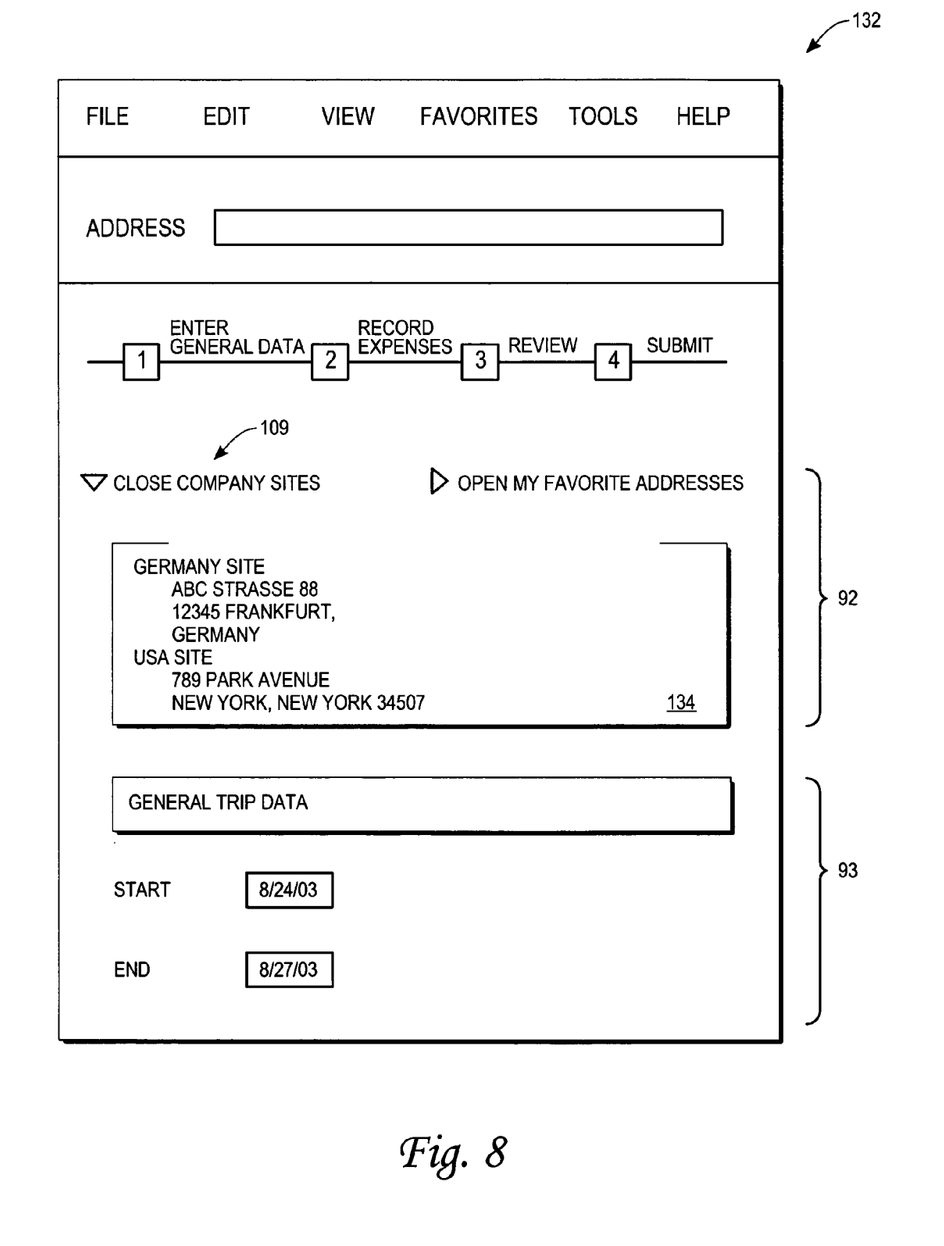

At box 130, the small device client machine 22 displays the user interface requested that includes the list of company sites 134, as illustrated on FIG. 8 according to an embodiment.

FIG. 8 illustrates a user interface 132, according to an exemplary embodiment, including an assistance content area 92 that is expanded to include the list of company sites 134. The user may utilize an insertion bar to select and copy the list of company sites 134.

Figure 9:
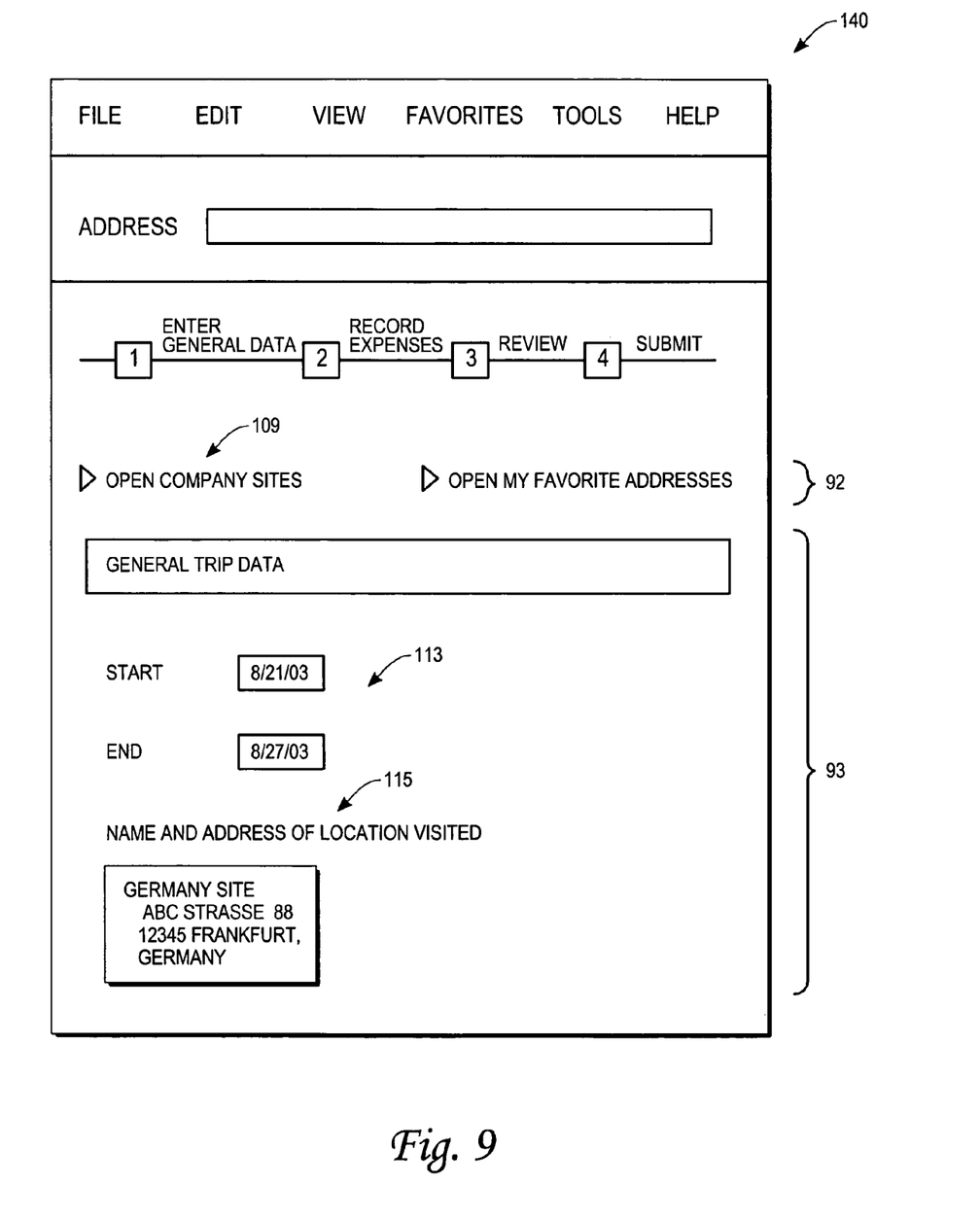

FIG. 9 illustrates a user interface 140, according to an embodiment. The user interface 140 illustrates that the user has copied address information for the German site into the input box 115 in the work content area 93 and collapsed the assistance content area 92 (e.g., the user selected the assistance string 109 while the assistance content area 92 was expanded). In summary, the enterprise application platform 12 has enabled the user to obtain and enter the list of company sites 134 into the input box 111 and maintain user interface context.

The above-described embodiment illustrated maintaining context and providing assistance to a user that operated a small device client machine 22 (e.g., a hand held device, PDA). It will be appreciated that processing is quite similar in an embodiment that includes a user operating a client machine 16 with a web client 18 (e.g., smart browser) with scripting (e.g., JavaScript) disabled or a web client 18 that does not support scripting (e.g., dumb browser).

It will also be appreciated that a user interface in an exemplary user interface component 86 may be included in a message and communicated to a web client 18 at a client machine 16 for interpreting under a script interpreter 82. Thus, the user interface controller(s) 87 and the user interface view(s) 89 may be resident on the client machine 16, thereby enabling client side control processing and web page rendering although communication with the enterprise application platform 12 would still be required to access the model 83.

In yet another embodiment, accessing the model 83 on the enterprise application platform 12 may be obviated by pre-loading the user interface storage 88 with the list of company sites 134 or with other information necessary to support the presentation of a user interface element that is hidden from view on a user interface.

Figure 10:
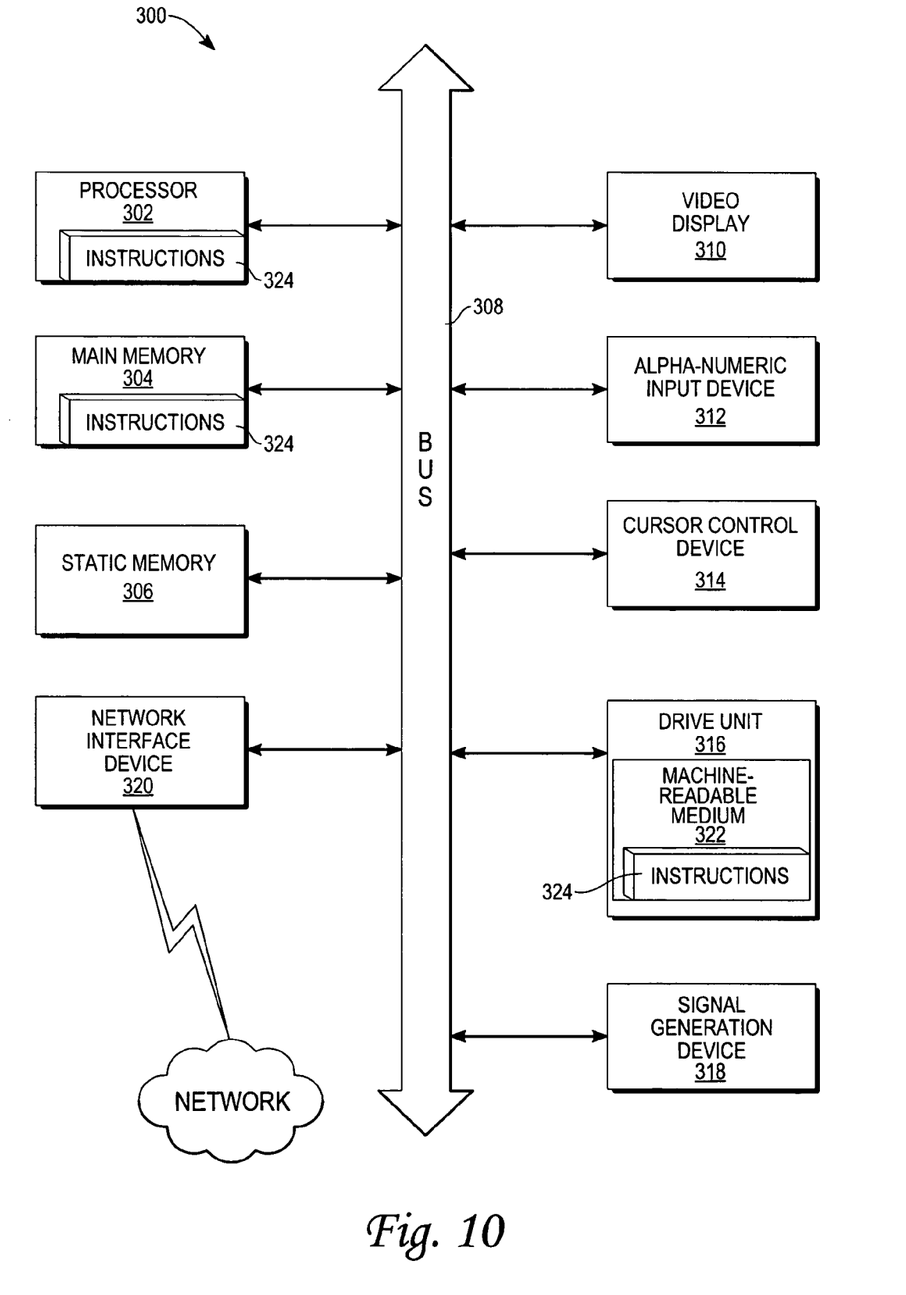
FIG. 10 illustrates a diagrammatic representation of a machine, in the exemplary form of a computer system, within which a set of instructions, for causing the machine to perform any one or more of the methodologies discussed herein, may be executed.

FIG. 10 shows a diagrammatic representation of a machine or platform in the exemplary form of a computer system 300 within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a server computer, a client computer, a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 300 includes a processor 302 (e.g., a central processing unit (CPU) a graphics processing unit (GPU) or both), a main memory 304 and a static memory 306, which communicate with each other via a bus 308. The computer system 300 may further include a video display unit 310 (e.g., a liquid crystal display (LCD) or a cathode ray tube (CRT)). The computer system 300 also includes an alphanumeric input device 312 (e.g., a keyboard), a cursor control device 314 (e.g., a mouse), a disk drive unit 316, a signal generation device 318 (e.g., a speaker) and a network interface device 320.

The disk drive unit 316 includes a machine-readable medium 322 on which is stored one or more sets of instructions (e.g., software 324) embodying any one or more of the methodologies or functions described herein. The software 324 may also reside, completely or at least partially, within the main memory 304 and/or within the processor 302 during execution thereof by the computer system 300, the main memory 304 and the processor 302 also constituting machine-readable media.

The software 324 may further be transmitted or received over a network 326 via the network interface device 320.

While the machine-readable medium 322 is shown in an exemplary embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention. The term "machine-readable medium" shall accordingly be taken to include, but not be limited to, solid-state memories, optical and magnetic media, and carrier wave signals.

Thus, a method and system to maintain a user interface context have been described. Although the present invention has been described with reference to specific exemplary embodiments, it will be evident that various modifications and changes may be made to these embodiments without departing from the broader spirit and scope of the invention. Accordingly, the specification and drawings are to be regarded in an illustrative rather than a restrictive sense.

What is claimed is:

1. A method to maintain a user interface context in a domain application, the method including:

generating a user interface on a web client at a client device for the domain application hosted by a remote server from one or more user interface components that control the user interface, the domain application executing under the web client at the client device, each user interface component of the domain application user interface including a metadata definition of user interface elements including a definition of a layout of the user interface elements on the client device, wherein each user interface component includes user interface logic to control the user interface elements defined in its metadata definition, the user interface elements providing a graphical representation of data objects hosted by the server, each user interface component being either displayed in the user interface or hidden from view, where data and interface logic of user interface components hidden from view are included in a persistent layer stored in the user interface, but are not displayed in the user interface, wherein data automatically flows between data objects bound to the user interface elements and their corresponding user interface elements defined in the user interface component, and wherein the user interface includes an input field to receive data input from a user to execute a task of the domain application;

receiving a request at one of the user interface components during execution of the domain application for a first user interface element that is hidden from view on the user interface and is related to information needed to perform a task in the domain application but is not displayed in the user interface when the request is received, where the first user interface element exists within the user interface component but is not displayed;

displaying the first user interface element in the user interface context in response to receiving the request at the one user interface component including integrating user interface elements of the one user interface component into the user interface, the first user interface element to provide data elements as options to enter into the input field to execute the task of the domain application to affect data objects hosted by the server and bound to the user interface elements;

receiving a user selection at the user interface component of one or more data elements of the first user interface element representing the data objects; and regenerating the user interface of the executing domain application to integrate the selected data elements into the input field of the user interface in response to receiving the user selection.

2. The method of claim 1, wherein the first user interface element is an assistance element that provides assistance to the user with respect to a user operation to be performed via the user interface.

3. The method of claim 1, wherein the regenerating the user interface includes expanding a content area.

4. The method of claim 3, wherein the regenerating includes rearranging a second user interface element on the user interface to facilitate an expansion of the content area.

5. The method of claim 4, further including regenerating the user interface to accommodate hiding the first user interface element on the user interface and rearranging the second user interface element on the user interface.

6. The method of claim 3, wherein the request specifies content that is to be displayed in the content area.

7. The method of claim 6, wherein the content is comprised of any one of a group including, a table, a calendar, a plurality of links for navigation.

8. The method of claim 6, wherein the user interface includes a plurality of user interface elements that are utilized to request corresponding content.

9. The method of claim 1, wherein the user interface comprises a web page interface for an enterprise application run under a browser.

10. The method of claim 1, further including communicating the user interface to a client machine.

11. An article of manufacture comprising a machine readable storage medium storing a set of instructions thereon that, when executed by a machine, cause the machine to:

generate a user interface on a web client at a client device for the domain application hosted by a remote server from one or more user interface components that control the user interface, the domain application executing under the web client at the client device, each user interface component of the domain application user interface including a metadata definition of user interlace elements including a definition of a layout of the user interface elements on the client device, wherein each user interface component includes user interface logic to control the user interface elements defined in its metadata definition, the user interface elements providing a graphical representation of data objects hosted by the server, each user interface component being either displayed in the user interface or hidden from view, where data and interface logic of user interface components hidden from view are included in a persistent layer stored in the user interface, but are not displayed in the user interface, wherein data automatically flows between data objects bound to the user interface elements and their corresponding user interface elements defined in the user interface component, and wherein the user interface includes an input field to receive data input from a user to execute a task of the domain application;

receive a request at one of the user interface components during execution of the domain application for a first user interface element that is hidden from view on the user interface and is related to information needed to perform a task in the domain application but is not displayed in the user interface when the request is received, where the first user interface element exists within the user interface component but is not displayed;

display the first user interface element in the user interface context in response to receiving the request at the one user interface component including integrating user interface elements of the one user interface component into the user interface, the first user interface element to provide data elements as options to enter into the input field to execute the task of the domain application to affect data objects hosted by the server and bound to the user interface elements;

receive a user selection at the user interface component of one or more data elements of the first user interface element representing the data objects; and regenerate the user interface of the executing domain application to integrate the selected data elements into the input field of the user interface in response to receiving the user selection, the regenerating of the user interface to maintain the user interface context in the domain application.

12. The article of manufacture of claim 11, wherein the first user interface element is an assistance element that provides assistance to the user with respect to a user operation to be performed via the user interface.

13. The article of manufacture of claim 11, wherein the regenerating the user interface includes expanding a content area.

14. The article of manufacture of claim 13, wherein the regenerating includes rearranging a second user interface element on the user interface to facilitate an expansion of the content area.

15. The article of manufacture of claim 14, further including regenerating the user interface to accommodate hiding the first user interface element on the user interface and rearranging the second user interface element on the user interface.

16. The article of manufacture of claim 13, wherein the request specifies content that is to be displayed in the content area.

17. The article of manufacture of claim 16, wherein the content is comprised of any one of a group including, a table, a calendar, a plurality of links for navigation.

18. The article of manufacture of claim 16, wherein the user interface includes a plurality of user interface elements that are utilized to request corresponding content.

19. The article of manufacture of claim 11, wherein the user interface comprises a web page interface for an enterprise application run under a browser.

20. The article of manufacture of claim 11, further including communicating the user interface to a client machine.

21. The method of claim 1, wherein regenerating the user interface further comprises:

hiding the displayed first user interface element.

22. The method of claim 21, wherein one user interface component controls the user interface to display the first user interface element, and a second user interface component controls the user interface to not display the first user interface element.

23. The article of manufacture of claim 11, wherein regenerate the user interface further comprises:

hide the displayed first user interface element.

24. The article of manufacture of claim 23, wherein one user interface component controls the user interface to display the first user interface element, and a second user interface component controls the user interface to not display the first user interface element.

* * * * *